United States Patent
Chung et al.

(10) Patent No.: US 10,298,850 B2
(45) Date of Patent: May 21, 2019

(54) MOBILE TERMINAL AND METHOD FOR GENERATING BACKGROUND IMAGES

(71) Applicant: LG Electronics Inc., Seoul (KR)

(72) Inventors: Sooyon Chung, Seoul (KR); Sujin Kim, Seoul (KR); Sunghye Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 92 days.

(21) Appl. No.: 15/297,267

(22) Filed: Oct. 19, 2016

(65) Prior Publication Data

US 2017/0118412 A1 Apr. 27, 2017

(30) Foreign Application Priority Data

Oct. 21, 2015 (KR) ........................ 10-2015-0146528

(51) Int. Cl.
*H04N 5/232* (2006.01)
*H04N 5/262* (2006.01)
*H04N 5/265* (2006.01)
*H04N 5/272* (2006.01)

(52) U.S. Cl.
CPC ..... *H04N 5/23293* (2013.01); *H04N 5/23216* (2013.01); *H04N 5/23238* (2013.01); *H04N 5/265* (2013.01); *H04N 5/2621* (2013.01); *H04N 5/272* (2013.01)

(58) Field of Classification Search
CPC .. H04N 5/23293; H04N 5/2621; H04N 5/265; H04N 5/23216; H04N 5/272; H04N 5/23238
USPC ....................................................... 348/239
See application file for complete search history.

(56) References Cited

U.S. PATENT DOCUMENTS

| | | |
|---|---|---|
| 2001/0005208 A1 | 6/2001 | Minami et al. |
| 2010/0171810 A1 | 7/2010 | Ohki |
| 2012/0063681 A1* | 3/2012 | Sandrew ............... G06T 11/001 382/167 |
| 2012/0075412 A1 | 3/2012 | Miyamoto et al. |
| 2013/0063645 A1* | 3/2013 | Aoyama ............ H04N 5/23293 348/333.01 |
| 2014/0181745 A1 | 6/2014 | Cui |
| 2014/0226053 A1* | 8/2014 | Winer ................ H04N 5/23293 348/333.05 |
| 2014/0354845 A1* | 12/2014 | Molgaard .............. H04N 1/215 348/222.1 |

(Continued)

OTHER PUBLICATIONS

Extended European Search Report in European Application No. 16173351.4, dated Feb. 28, 2017, 8 pages (with English translation).

(Continued)

*Primary Examiner* — Nhan T Tran
*Assistant Examiner* — Chan T Nguyen
(74) *Attorney, Agent, or Firm* — Fish & Richardson P.C.

(57) ABSTRACT

A mobile terminal that includes a camera; a display unit; and a controller configured to: control the camera, display a preview screen on the display unit, obtain a first image through the camera while displaying the preview screen, obtain a second image in response to receiving a first input, generate a background image using the first image, combine the background image and the second image to generate a combined image, store the combined image, and display, on the display unit, the combined image, in response to receiving a second input is disclosed.

16 Claims, 21 Drawing Sheets

(56) References Cited

U.S. PATENT DOCUMENTS

| | | | |
|---|---|---|---|
| 2015/0062291 A1 | 3/2015 | Kim et al. | |
| 2016/0064035 A1* | 3/2016 | Bostick | G11B 27/036 |
| | | | 386/241 |
| 2017/0200314 A1* | 7/2017 | Jeong | H04N 5/262 |

OTHER PUBLICATIONS

European Office Action in European Appln. No. 16173351.4, dated Mar. 26, 2019, 5 pages.

* cited by examiner

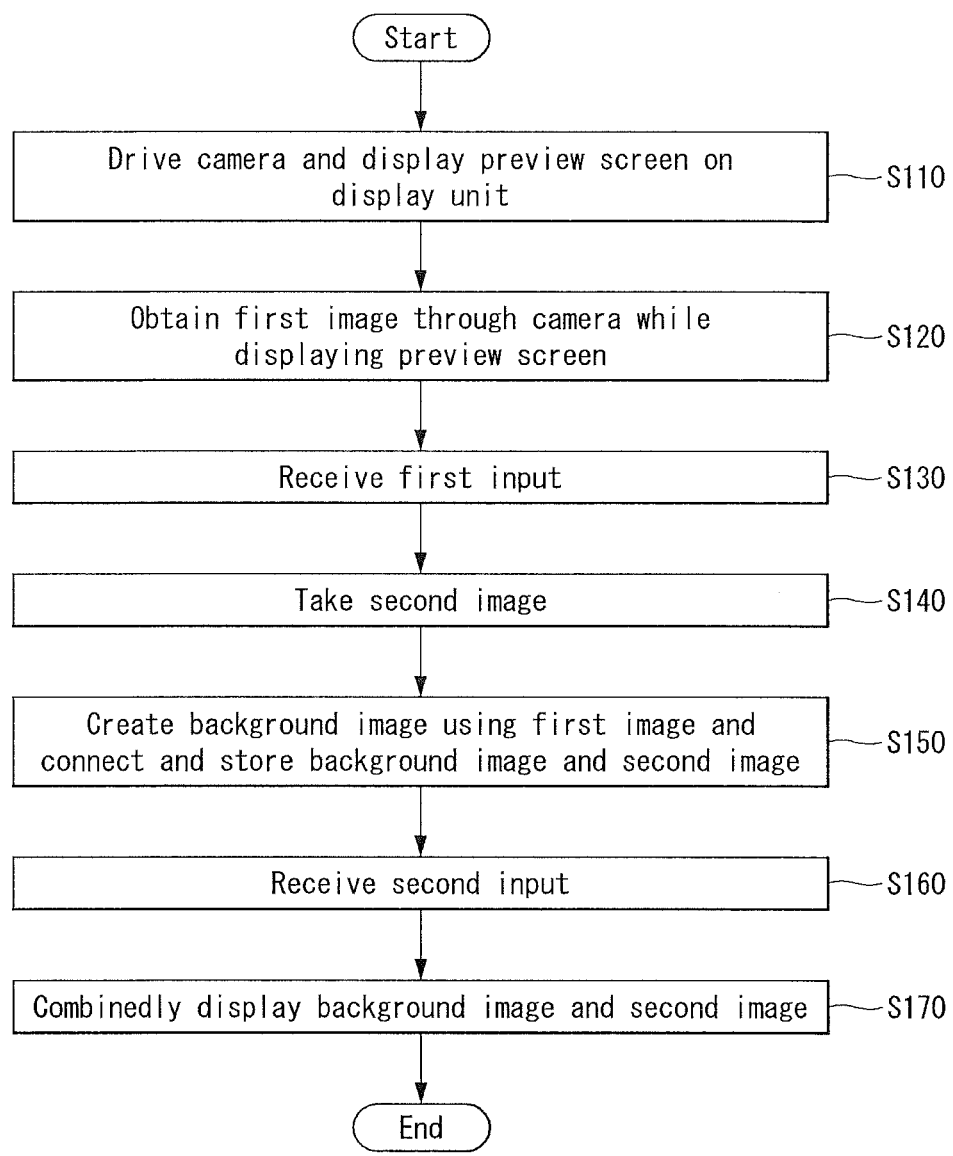

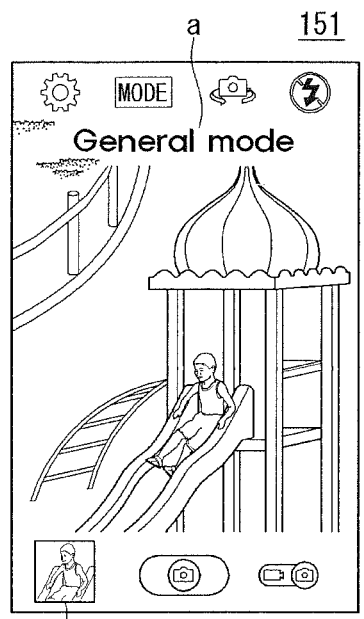
FIG. 4A
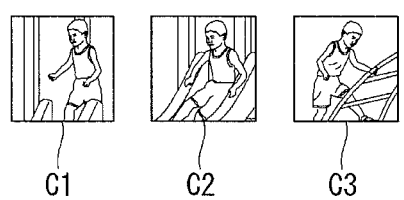
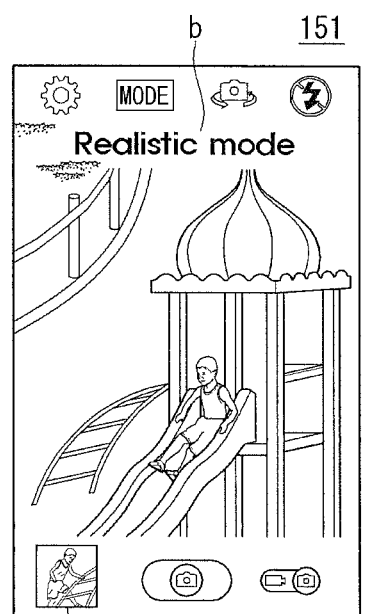
FIG. 4B

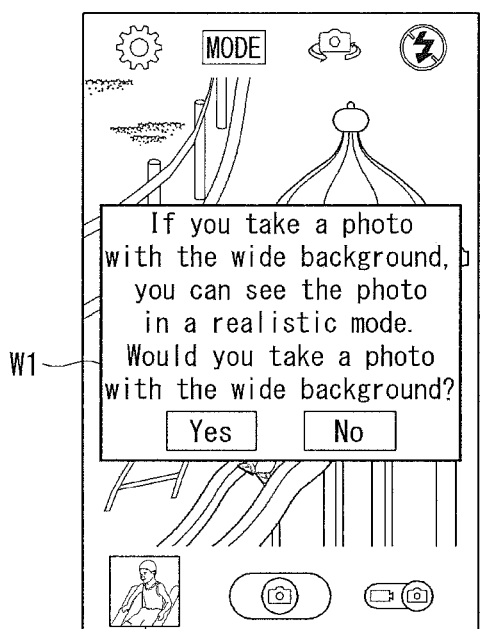
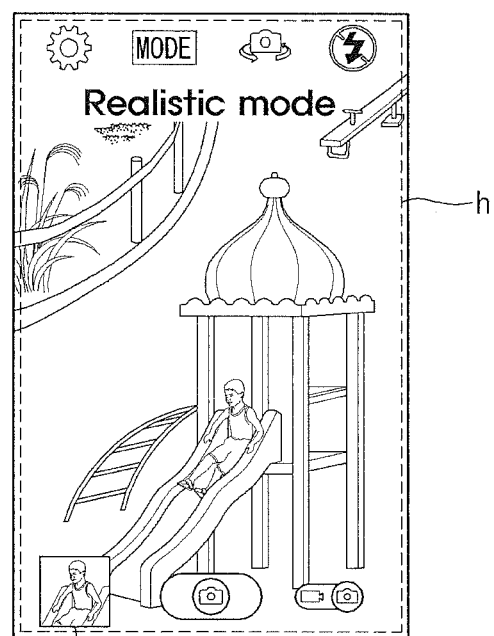
FIG. 5A  FIG. 5B

FIG. 12A
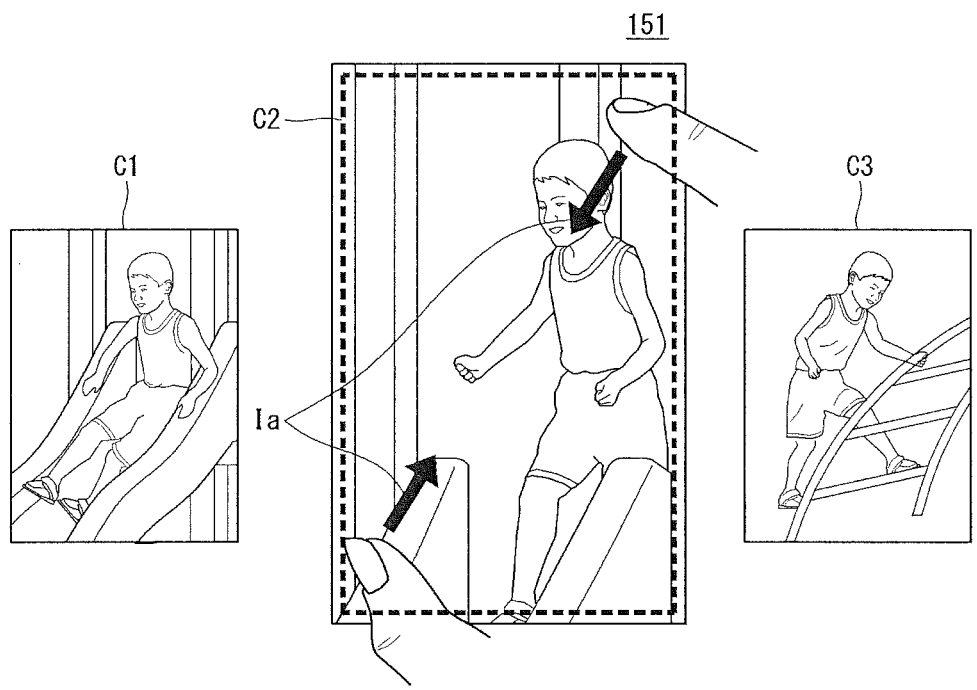
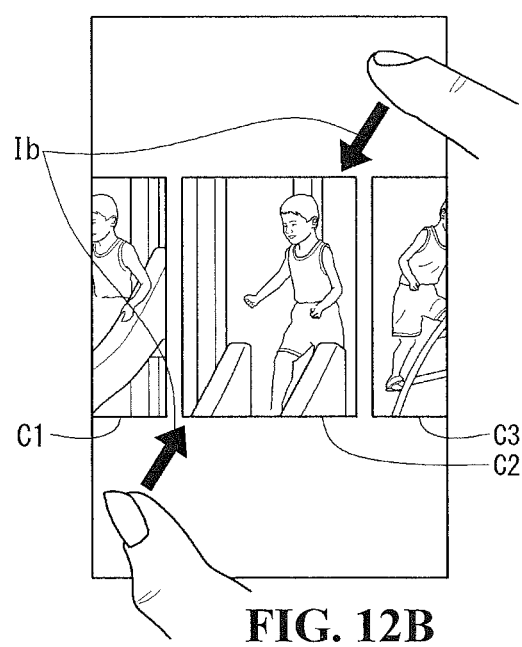
FIG. 12B
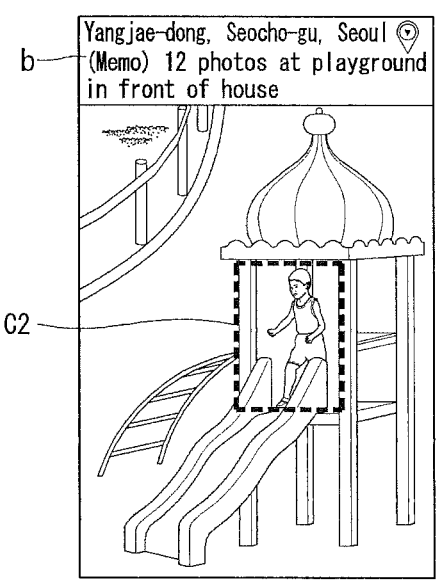
FIG. 12C

FIG. 15A
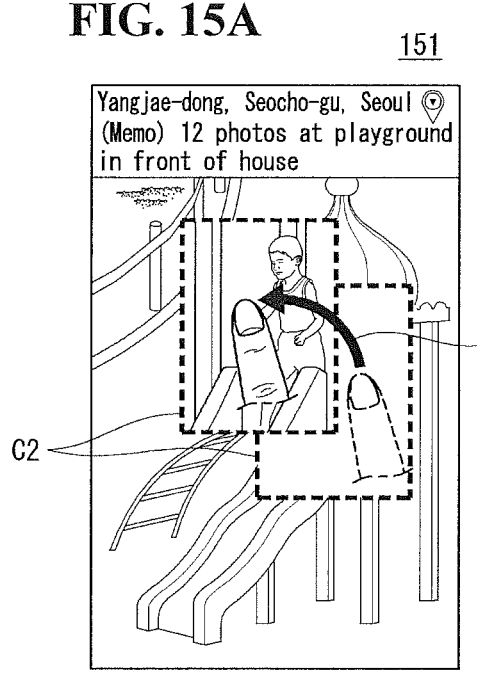
FIG. 15B
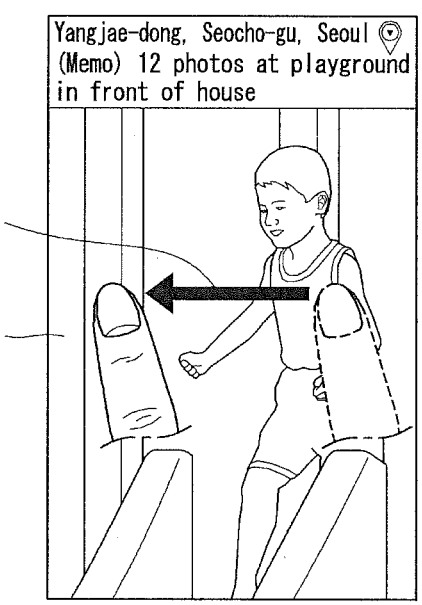
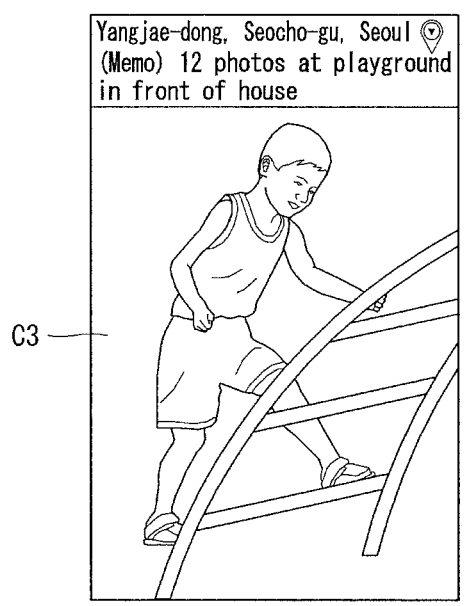
FIG. 15C

FIG. 16A
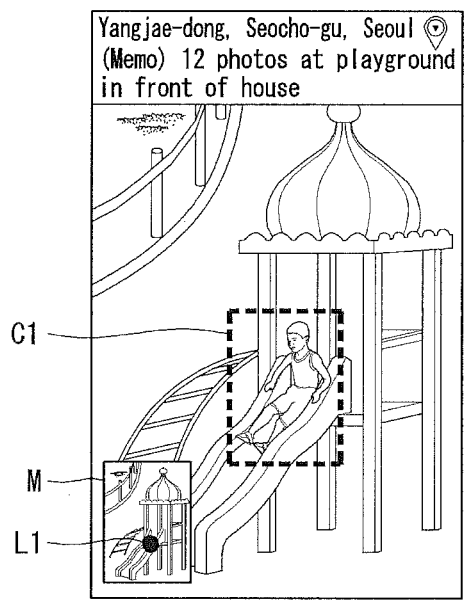
FIG. 16B
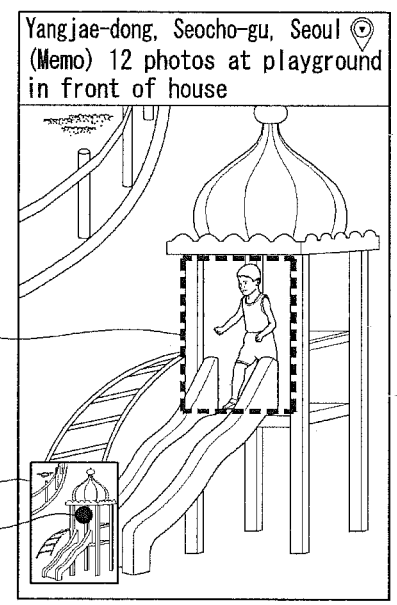
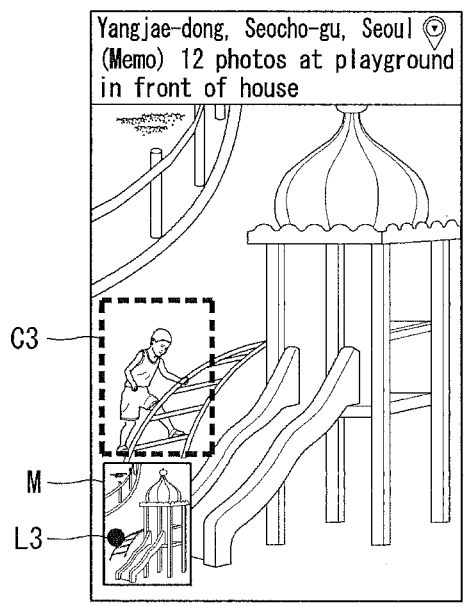
FIG. 16C

FIG. 17A
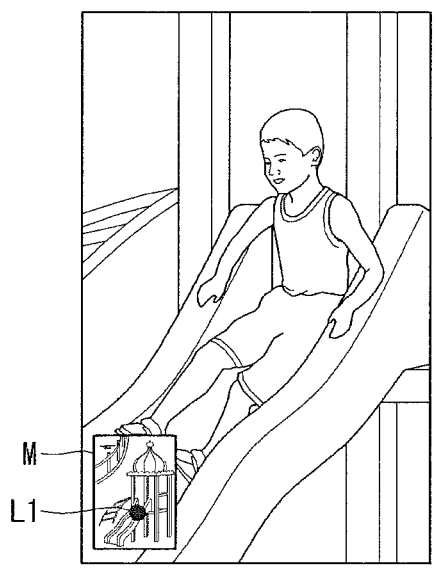
FIG. 17B
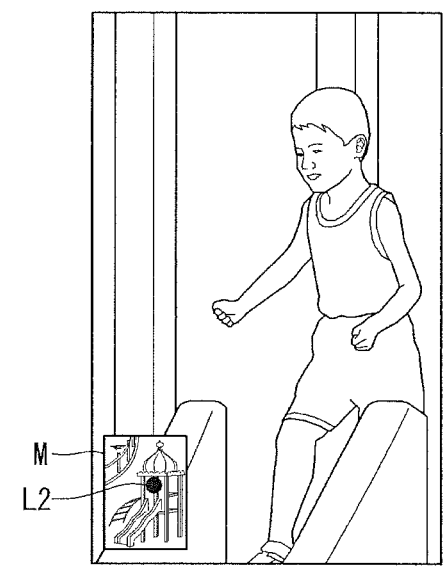
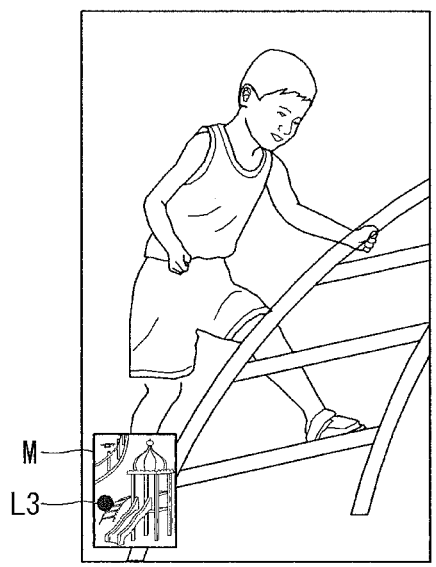
FIG. 17C

FIG. 19A
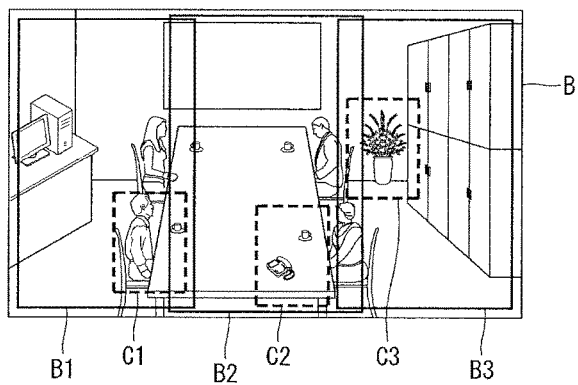
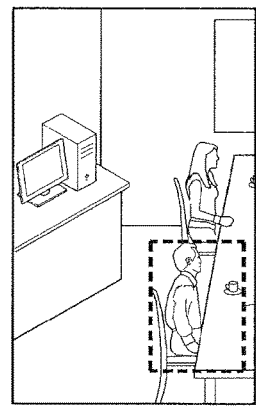
FIG. 19B
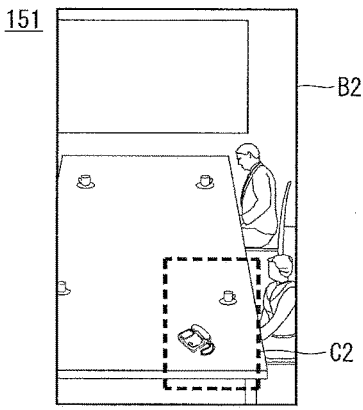
FIG. 19C
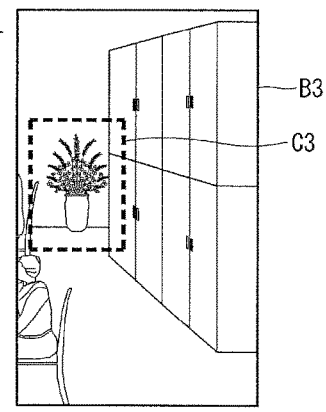
FIG. 19D

MOBILE TERMINAL AND METHOD FOR GENERATING BACKGROUND IMAGES

CROSS-REFERENCE TO RELATED APPLICATION

This application claims priority to and the benefit of Korean Patent Application No. 10-2015-0146528 filed on Oct. 21, 2015 in the Korean Intellectual Property Office, the entire contents of which are incorporated herein by reference in its entirety.

FIELD

The present disclosure relates to a mobile terminal providing a photo gallery application.

BACKGROUND

Terminals may be generally classified as mobile/portable terminals or stationary terminals according to their mobility. Mobile terminals may also be classified as handheld terminals or vehicle mounted terminals depending on whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

SUMMARY

In general, one innovative aspect of the subject matter described in this specification can be embodied in a mobile terminal comprising: a camera; a display unit; and a controller configured to: control the camera, display a preview screen on the display unit, obtain a first image through the camera while displaying the preview screen, obtain a second image in response to receiving a first input, generate a background image using the first image, combine the background image and the second image to generate a combined image, store the combined image, and display, on the display unit, the combined image, in response to receiving a second input.

In general, another innovative aspect of the subject matter described in this specification can be embodied in methods that include the actions of controlling a mobile terminal comprising: displaying, on a display unit, a preview screen by controlling a camera; obtaining a first image through the camera while displaying the preview screen; obtaining a second image based on receiving a first input; generating a background image using the first image; combining the background image and the second image to generate a combined image; storing the combined image; and displaying the combined image based on receiving a second input. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The controller is further configured to: omit, from the first image, an object that was moving during obtaining of the first image, combine a plurality of images, including the first image, based on a similarity between the plurality of images, and generate a background image based on the combined plurality of images. Based on a partial area of the background image being omitted, the controller is further configured to: request another background image that corresponds to the background image and that is stored on a server, and generate the omitted partial area of the background image using the other background image that is stored on the server. Based on a partial area of the background image being omitted, the controller is further configured to: display a guide on the preview screen, and display a first indicator on the preview screen based on all of the partial area being included in the preview screen. The controller is further configured to obtain the first image including all of a boundary line of a fixed object included in the background image based on displaying the guide on the preview screen. Based on a number of times, the controller successively obtains the second image and the second image having location information that is equal to or greater than a predetermined value and the controller is further configured to change the mobile terminal to a mode that is configured to generate the background image. Based on a change in an angle of the camera being equal to or greater than a predetermined reference value and based on displaying the preview screen, the controller is configured to generate the background image. The controller is further configured to display a boundary line that differentiates the second image from the background image. The controller is further configured to: adjust a size of the second image based on a ratio of the second image to the background image, and overlap the second image on the background image. Based on the controller displaying the second image on all of the display unit and receiving a third input that is associated with the display unit, the controller is configured to display, on the display unit, the combined image. Based on the controller displaying the combined image, the controller is further configured to automatically reproduce, on the display unit, the second image on the background image based on a shooting time of the second image. Based on an object that is in the first image and that was moving during obtaining of the first image, the controller is further configured to automatically reproduce, on the display unit and on the background image, an image of the object that was moving during obtaining of the first image based on an obtainment time of the first image. Based on the image of the objet that was moving during obtaining of the first image being automatically reproduced, the controller is further configured to set a reproduction cycle of the objet that was moving during obtaining of the first image to be less than a reproduction cycle of the second image. Based on the controller receiving a fourth input associated with the display unit and based on the display unit displaying the combined image, the controller is further configured to display the second image on all of the display unit. Based on the controller displaying the second image on all of the display unit, the controller is further configured to display a zoom-out image that includes the background image and data indicating a location where the mobile terminal obtained the second image in a first area of the display unit. Based on the combined image being in a plurality of second images, the controller is configured to: display the plurality of second images combined with and the background image, and display a second indicator in a specific area of the background image based on two or more of the plurality of second images being displayed in the specific area of the background image. The controller is further configured to include weather information or time information stored in the mobile terminal in the background image, and store a plurality of background images that correspond to a same location depending on the weather information or the time information. Based on the controller selecting a specific second image among a plurality of second images displayed on an execution screen of a gallery application, the controller is further configured to: identify a specific background image connected to the specific second image, display, on the display unit, the specific background image combined with the specific second image on the display unit, and display, on the display unit, a popup window that prompts a user whether or not another second image connected to the specific background image is displayed along with the specific second image. Based on the controller obtaining the first image at a location and an angle that are suitable for three-dimensional (3D) effect, the controller is further configured to: generate the background image with the 3D effect, and rotatively display the background image with the 3D effect and the second image in obtainment order of the first image.

Particular embodiments of the subject matter described in this specification can be implemented so as to realize one or more of the following advantages. Compared to a conventional mobile terminal, a mobile terminal can create a background image using a first image displayed on a preview screen while driving a camera and can display a second image and the background image together.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow chart showing a method for driving a mobile terminal.

FIGS. 3 to 20 illustrate various examples of a method for controlling a mobile terminal.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
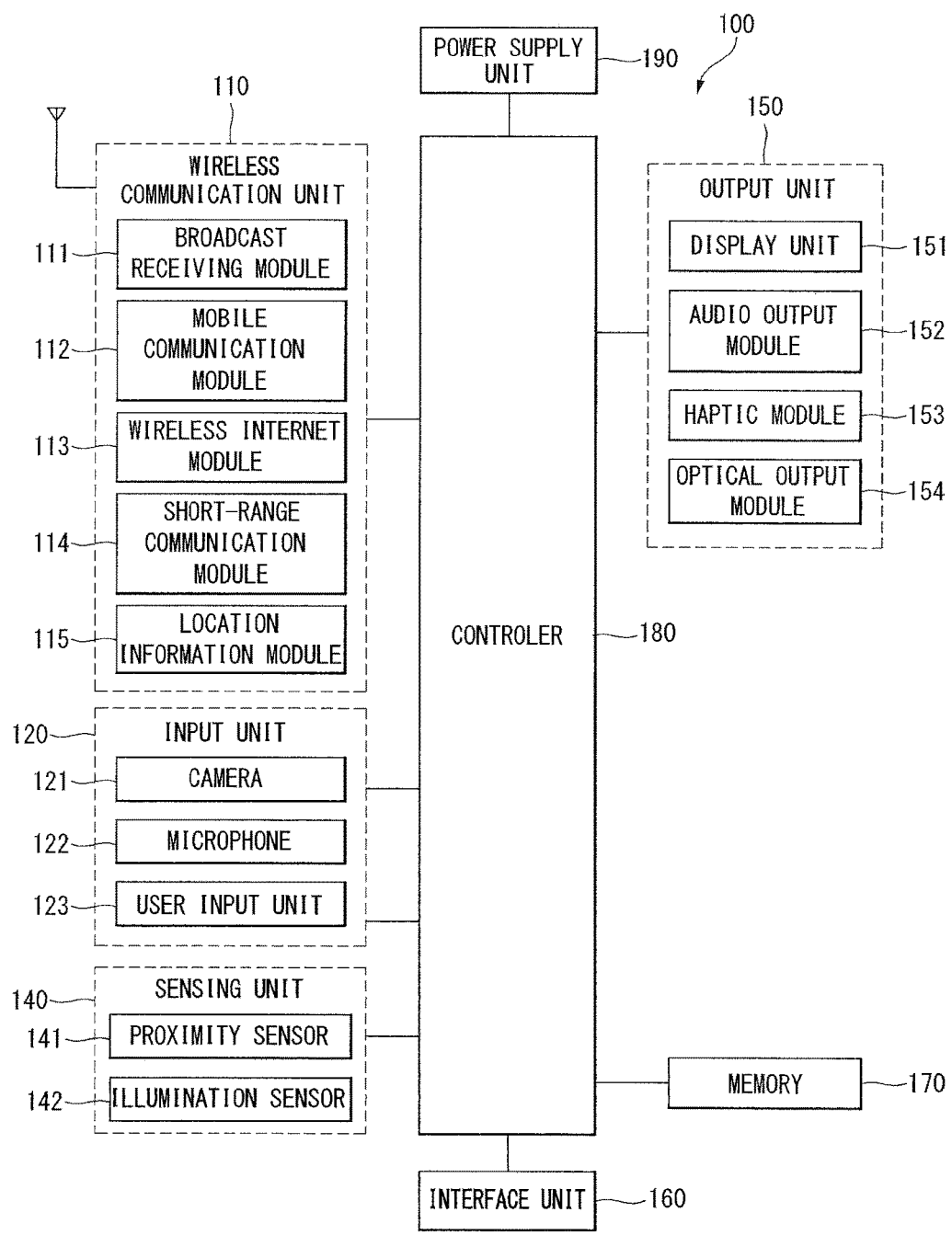
FIG. 1A is a block diagram of a mobile terminal.
Figure 1B:
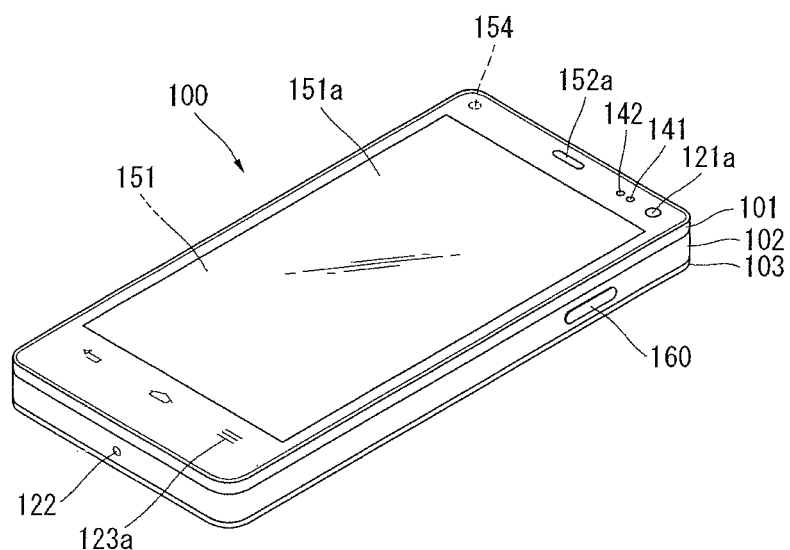
FIGS. 1B and 1C are conceptual views of one example of the mobile terminal, viewed from different directions.
Figure 1C:
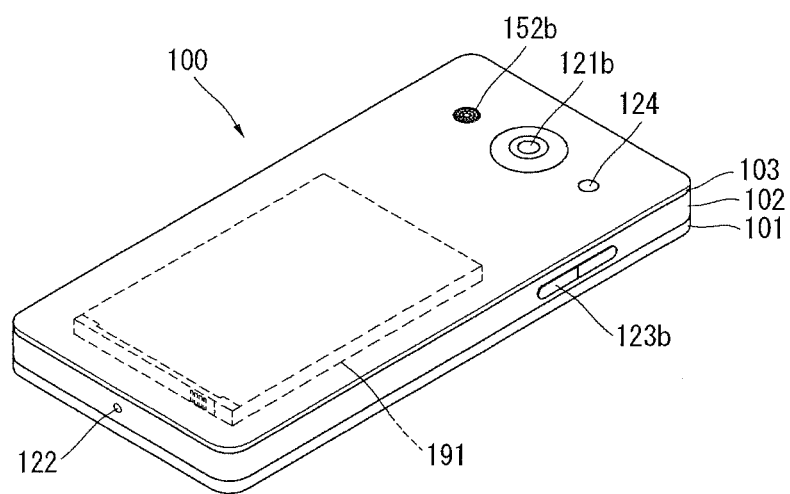

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS, etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Some-times, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power(RSRP), reference signal received quality(RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

Further preferred embodiments will be described in more detail with reference to additional drawing figures. It is understood by those skilled in the art that the present features can be embodied in several forms without departing from the characteristics thereof.

FIG. 2 is a flow chart showing a method for driving a mobile terminal. FIGS. 3 to 20 illustrate various examples of a method for controlling a mobile terminal.

Referring to FIG. 2, the controller 180 of the mobile terminal may drive the camera 121 and display a preview screen on the display unit 151 in step S110. The controller 180 may obtain a first image through the camera 121 while displaying the preview screen in step S120.

More specifically, the controller 180 may activate the camera 121 by running a camera application and display an image obtained through the camera 121 on the preview screen. When the camera 121 moves up and down or left to right in accordance with a movement of the mobile terminal, the controller 180 may display different preview screens on the display unit 151 depending on a movement trace of the camera 121. The controller 180 may obtain a plurality of first images depending on the movement trace of the camera 121, and the plurality of first images may be temporarily stored in a buffer.

When the controller 180 of the mobile terminal receives a first input in step S130, the controller 180 may take a second image in step S140. In the embodiment disclosed herein, the first input may be at least one of a touch input with respect to the display unit 151 or an input with respect to an operational key.

When the controller 180 receives a touch input with respect to a photographing icon displayed on the preview screen, receives a specific input with respect to a predetermined area of the preview screen, or receives an input with respect to the operational key for the photographing trigger, the controller 180 may take the second image displayed on the preview screen. Thus, the taken second image may be included in the plurality of first images.

After the first and second images are obtained, the controller 180 of the mobile terminal may create a background image using the first image and connect and store the background image and the second image in step S150.

More specifically, the controller 180 may create the background image using the first image obtained through the camera 121 while displaying the preview screen, irrespective of a shooting mode. Only when the shooting mode is changed to a realistic mode, the controller 180 may create the background image. In the embodiment disclosed herein, the realistic mode indicates a mode, in which the background image is created using the first image, that is obtained through the camera 121 while displaying the preview screen and is temporarily stored in the buffer, and the second image taken by the controller 180 is displayed on the background image.

When the number of times the controller 180 successively takes the second image having the same location information is equal to or greater than a predetermined value or a change in an angle of the camera while displaying the preview screen is equal to or greater than a predetermined reference value, the controller 180 may change the shooting mode to the realistic mode or may create the background image irrespective of the shooting mode.

The controller 180 may omit a moving object included in the first image and combine the plurality of first images using similarity between the first images to create one background image.

The controller 180 may create the background image including all of boundary lines of a fixed object included in the first image obtained through the camera while displaying the preview screen.

When the controller 180 does not obtain a partial image of the fixed object, the controller 180 may receive a corresponding background image from a server and use the received background image in producing the background image. When the controller 180 does not obtain a partial image of the fixed object included in the background image while displaying the preview screen and at the same time producing the background image, the controller 180 may display a guide on the preview screen and cause the entire image of the fixed object to be included in the background image. When an omitted area of the background image is included in the preview screen, the controller 180 may display a first indicator on the preview screen. For example, when the omitted area of the background image is included in the preview screen, the controller 180 may differently display a contrast and a color of the omitted area of the preview screen or display the boundary line of the preview screen as a highlight.

The controller 180 may connect and store the created background image and the second image. In this instance, the plurality of second images may be connected to one background image and stored.

The controller 180 may reflect weather information or time information stored in the mobile terminal on the background image and store the plurality of background images corresponding to the same location information depending on the weather information or the time information.

When the controller 180 of the mobile terminal receives a second input in step S160, the controller 180 may combinedly display the background image and the second image in step S170. In the embodiment disclosed herein, the second input indicates an input for displaying an image taken by running a gallery application.

When the controller 180 takes at least one second image through a drive of the camera 121 and then receives a touch input with respect to a preview area displayed on the preview screen, the controller 180 may display the second image on the background image. The controller 180 may display a boundary line for differentiating the second image from the background image. Further, the controller 180 may adjust the size of the taken second image based on a ratio of the second image to the background image and overlappingly display the second image on the background image.

When the controller 180 of the mobile terminal displays the second image as the entire screen of the display unit 151 and receives a third input with respect to the display unit 151, the controller 180 may control the display unit 151 so that the background image and the second image are combinedly displayed. For example, when the controller 180 receives a pinch-in input in a state where the second image is displayed as the entire screen of the display unit 151, the controller 180 may display the screen, in which the second image is displayed on the background image, as the entire screen of the display unit 151. Further, when the controller 180 receives the pinch-in input in a state where the second image is displayed as the entire screen of the display unit 151, the controller 180 may zoom out the second image and display the zoom-out second image on the display unit 151. When the controller 180 again receives the pinch-in input, the controller 180 may display the screen, in which the second image is displayed on the background image, as the entire screen of the display unit 151.

When the controller 180 of the mobile terminal combinedly displays the background image and the second image, the controller 180 may control the display unit 151 so that the second image is automatically reproduced on the background image depending on shooting time of the second image. Namely, the controller 180 may automatically reproduce the N second images, which are connected to the same background image and stored, on the same background image at predetermined time intervals.

When the moving objet is included in the first image, the controller 180 may control the display unit 151 so that an image of the moving objet is automatically reproduced on the background image depending on an obtaimnent time of the first image. In this instance, the controller 180 may set a reproduction cycle of the moving objet to be relatively shorter than a reproduction cycle of the second image.

When the controller 180 receives a fourth input with respect to the display unit 151 in a state where the controller 180 combinedly displays the background image and the second image, the controller 180 may display the second image as the entire screen of the display unit 151. In the embodiment disclosed herein, the fourth input may be an input corresponding to the third input or another input. In the following description, the embodiment describes a mode, in which the background image and the second image are combined and displayed, as the realistic mode and describes a mode, in which the second image is displayed as the entire screen of the display unit 151, as a general mode for the sake of brevity and ease of reading.

When the controller 180 displays the second image as the entire screen of the display unit 151 or combinedly displays the second image and the background image, the controller 180 may display a zoom-out image indicating the background image and a location of the second image on a first area of the display unit 151. In the instance, the first area may be one of a left edge area or a right edge area of the display unit 151.

The controller 180 may switch between the realistic mode and the general mode depending on the receipt of the third input or the fourth input.

Each of the first to fourth inputs may be one of a touch input with respect to a specific icon, a drag input, a pinch-in or pinch-out input, a swipe input, a force touch input, touch input with respect to the operational key. Other inputs may be used.

When the plurality of second images connected to the same background image are displayed, the controller 180 may display the plurality of second images on one background image. When the two or more second images are displayed in a specific area of the background image, the controller 180 may overlappingly display the two or more second images and display a second indicator in the specific area of the background image.

When the controller 180 selects a specific second image among the plurality of second images displayed on an execution screen of the gallery application, the controller 180 may search a specific background image connected to the specific second image and combinedly display the specific background image and the specific second image on the display unit 151. The controller 180 may display a popup window, asking whether or not another second image connected to the specific background image is displayed along with the specific second image, on the display unit 151.

When the first images are obtained at different locations and different angles, the controller 180 may create the background image having a three-dimensional (3D) effect. When the controller 180 reproduces the image in the realistic mode, the controller 180 may rotatively display the 3D background image and the taken second image in obtainment order of the first images.

Various examples of a method for controlling the mobile terminal are described in detail below with reference to FIGS. 3 to 20.

An example method for controlling the mobile terminal is a method for producing the background image and connectively storing the background image and the taken image. The controller may create the background image irrespective of the shooting mode and create the background image only when the shooting mode is changed to the realistic mode.

FIGS. 3 to 6 illustrate a method for producing a background image in the mobile terminal.

Figure 3:
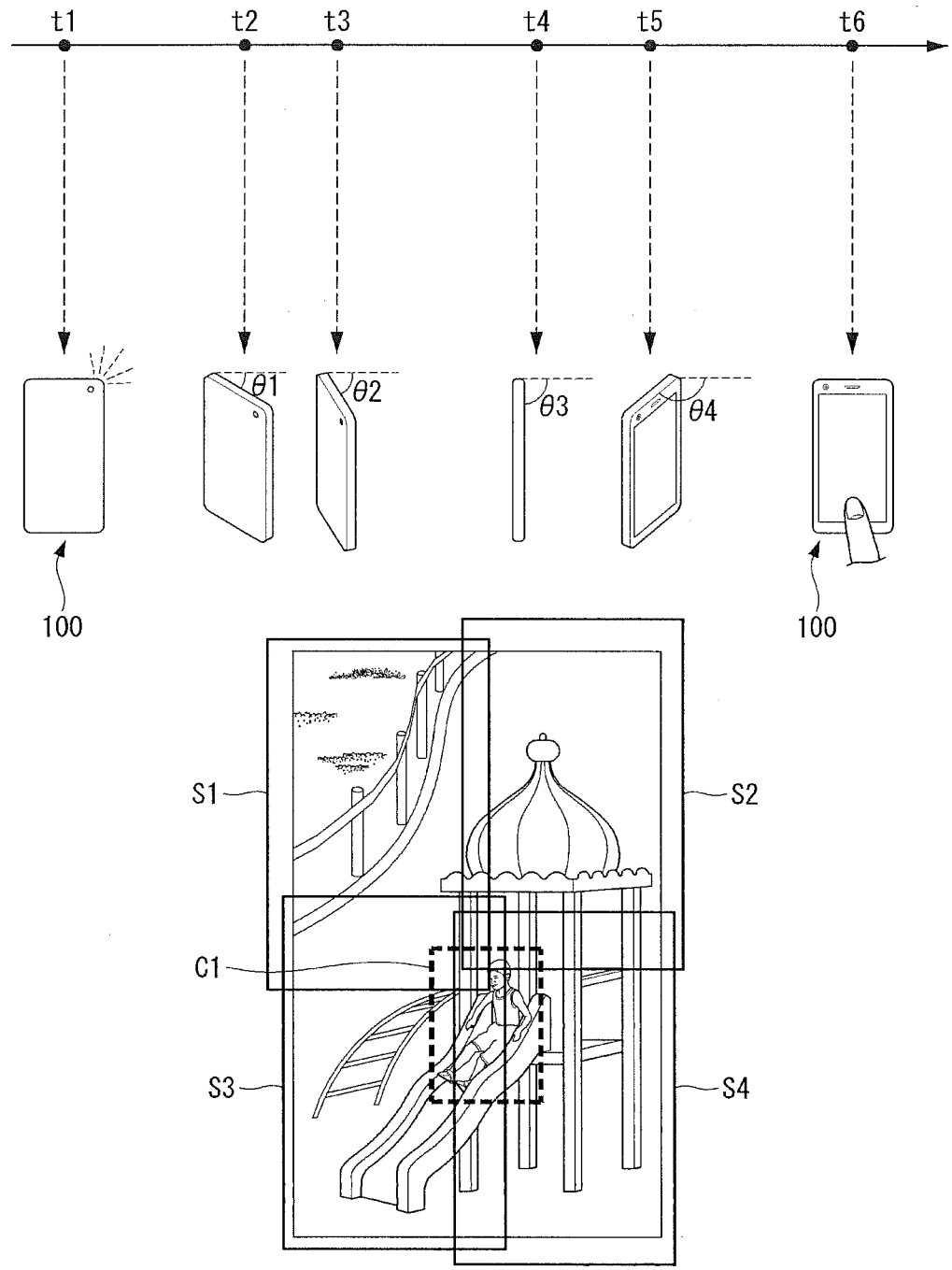
Figure 6A:
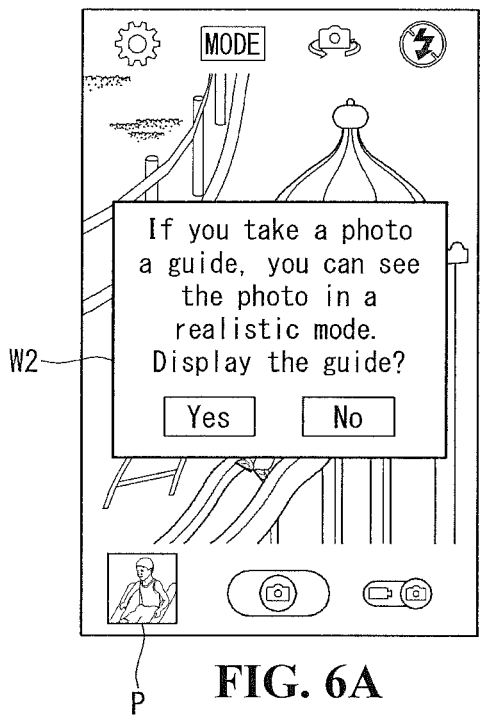
Figure 6B:
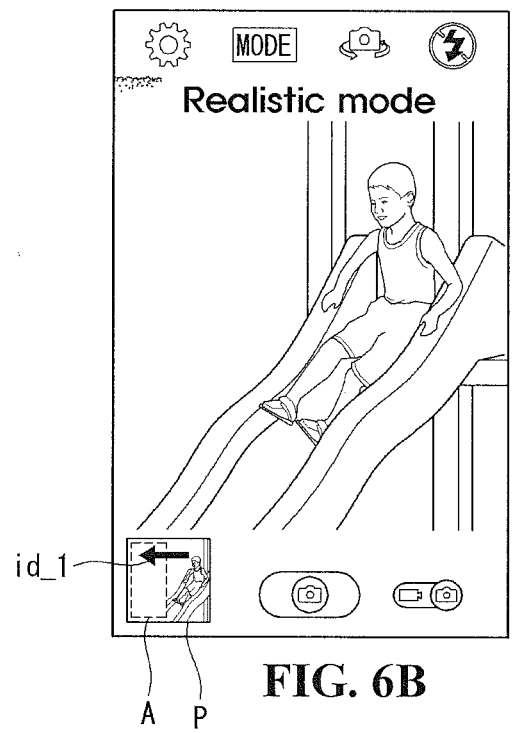
Figure 6C:
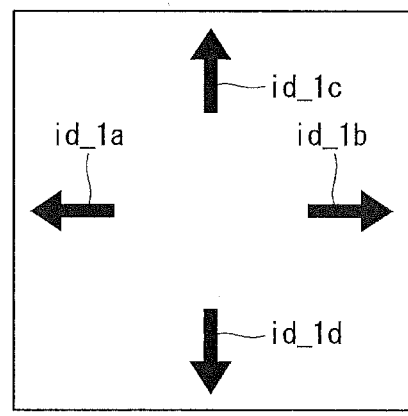
Figure 6D:
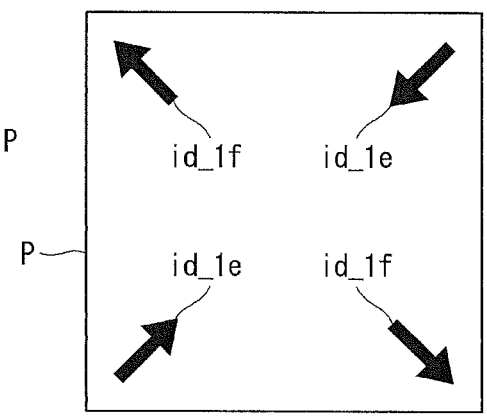

Referring to FIG. 3, when the controller 180 of the mobile terminal drives the camera 121 and a change in an angle of the camera 121 is equal to or greater than a predetermined reference value, the controller 180 may create a background image. In this instance, the controller 180 may change the shooting mode from the general mode to the realistic mode or maintain the general mode. The change in the angle indicates a change in the angle at a specific time point. When the change in the angle of the camera 121 at the specific time point is equal to or greater than the predetermined reference value, the controller 180 may create the background image using a first image obtained through the camera 121 until a drive of the camera 121 is ended.

More specifically, the controller 180 may drive the camera 121 at a time point t1, obtain a first preview screen S1 through the camera 121, and display the first preview screen S1 on the display unit 151.

When the controller 180 senses a change θ1 in the angle of the camera 121 at a time point t2, the controller 180 may determine whether or not the change θ1 is equal to or greater than the predetermined reference value. When the change θ1 is equal to or greater than the predetermined reference value, the controller 180 may obtain a second preview screen S2 through the camera 121 and display the second preview screen S2 on the display unit 151. In the embodiment disclosed herein, the change in the angle may indicate a change in a location of a lens of the camera 121 displayed on a space and may be represented as a change in an angle in the x-axis, y-axis, and z-axis directions. Further, the predetermined reference value may be represented as a change in an angle with respect to each of the x-axis, the y-axis, and the z-axis. In the embodiment disclosed herein, the change in the angle may be represented as a change in an angle on the x-y plane for the sake of brevity and ease of reading.

The controller 180 may create one background image using first images S1 to S4 obtained for a period of time from a time point t2 to a time point t6, at which the drive of the camera 121 is ended. The controller 180 may create the background image, in which the first images S1 to S4 are naturally connected, using similarity between the first images S1 to S4. In this instance, the controller 180 may create the background image, so that all of boundary lines of a fixed object are included in the background image. Further, controller 180 may omit a moving object included in the first images and create the background image.

The controller 180 may combinedly display a second image C1 taken between the time point t1 and the time point t6 and the created background image. In this instance, the second image C1 is an image obtained when the controller 180 receives a touch input with respect to a photographing icon or receives an input with respect to an operational key for the photographing trigger, and may be stored in the memory 170.

Referring to FIG. 4, when the number of times the controller 180 of the mobile terminal successively takes the second image having the same location information is equal to or greater than a predetermined value, the controller 180 may change the shooting mode to the realistic mode capable of creating the background image.

More specifically, when the controller 180 successively takes the second image (C1 to C3) having the same location information (for example, OOO playground) N (for example, N is three) times equal to or greater than the predetermined value in the general mode 'a' shown in (a) of FIG. 4, the controller 180 may change the shooting mode from the general mode to the realistic mode 'b' shown in (b) of FIG. 4 and create the background image. The controller 180 may display all of the shooting modes 'a' and 'b' on the preview screen when the shooting mode is changed.

Referring to FIGS. 5 and 6, when conditions for creating the background image are satisfied, the controller 180 of the mobile terminal may display a guide for changing the shooting mode to the realistic mode on the preview screen. When an action corresponding to contents of the guide is sensed, the controller 180 may change the shooting mode to the realistic mode.

When the controller 180 creates the background image using the first image obtained through the camera 121 while displaying the preview screen, the controller 180 may display a popup window W1, that asks whether or not change the shooting mode to the realistic mode, on the preview screen when a partial area of the background image is omitted.

More specifically, when the conditions for creating the background image are satisfied, the controller 180 may display the popup window W1, that states "If you take a photo with the wide background, you can see the photo in a realistic mode. Would you take a photo with the wide background?", in a state where the preview screen is displayed. When the user selects "Yes", the controller 180 may change the shooting mode to the realistic mode. When the controller 180 can complete the background image using the first image obtained through the camera 121 as the user moves with the mobile terminal so as to take the photo with the wider background, the controller 180 may display a first indicator h. In this instance, as shown in FIG. 5, the first indicator h may be displayed as highlight, blinking, etc. at an edge of the preview screen.

More specifically, when the conditions for creating the background image are satisfied, the controller 180 may display the popup window W1, that states "If you take a photo along a guide id1, you can see the photo in a realistic mode. Display the guide id1?", in a state where the preview screen is displayed. When the user selects "Yes", the controller 180 may change the shooting mode to the realistic mode. The controller 180 can complete the background image using the first image obtained through the camera 121 as the user moves the mobile terminal in a guide direction. In this instance, as shown in (c) and (d) of FIG. 6, the guide direction may one of a left direction id_1a, a right direction id_1b, an upper direction id_1c, a lower direction id_1d, a pinch-in direction id_1e, and a pinch-out direction id_1f.

Figure 7A:
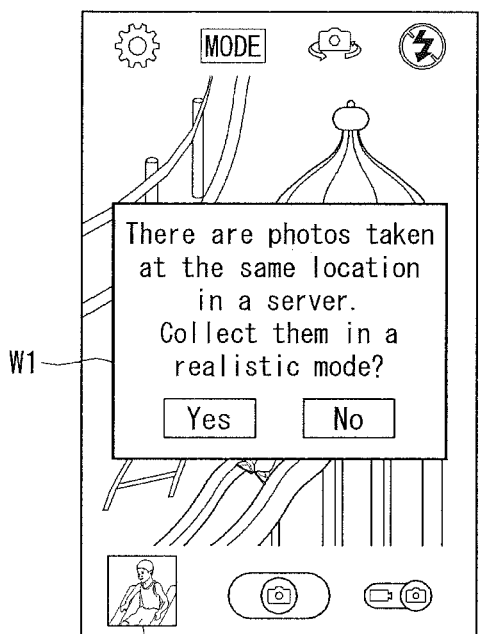
Figure 7B:
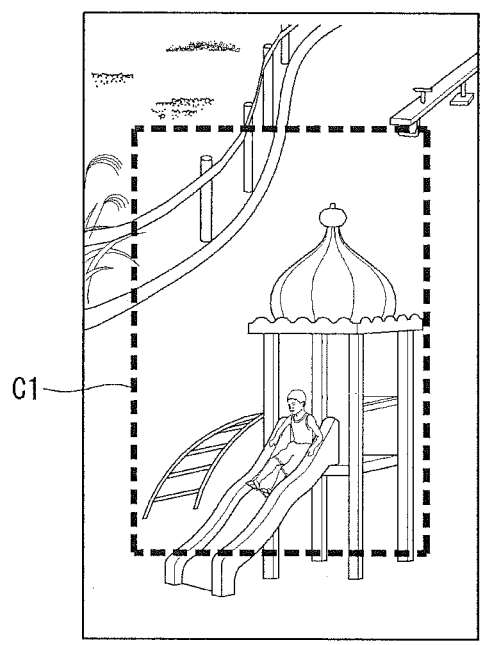
Figure 8:
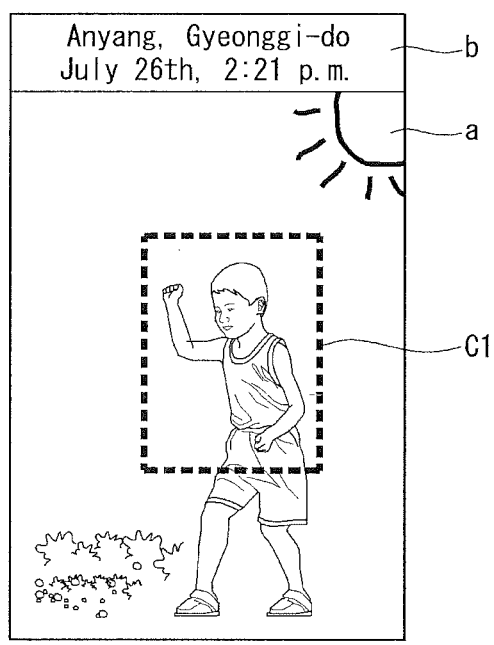
Figure 9A:
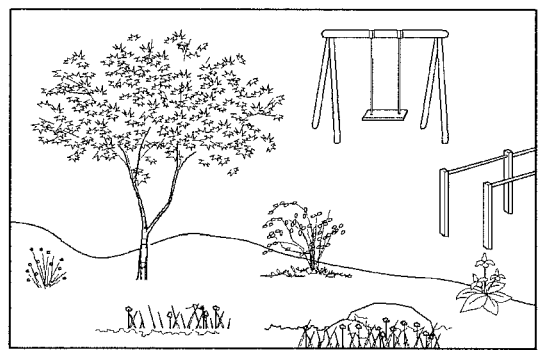
Figure 9B:
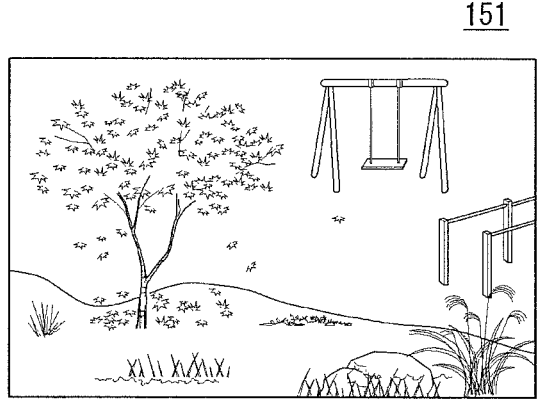
Figure 9C:
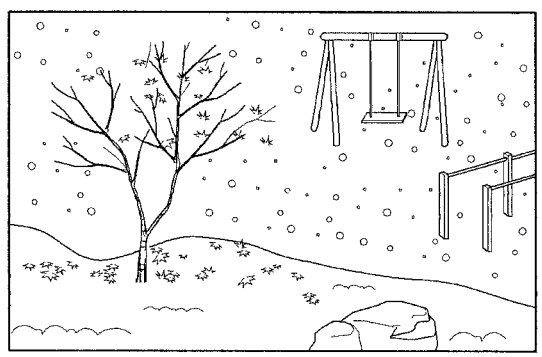
Figure 10A:
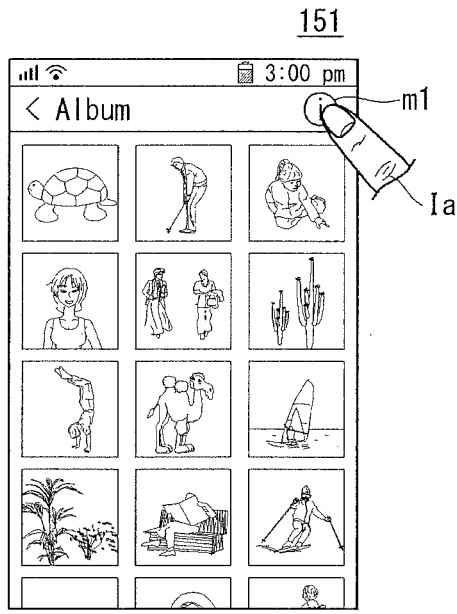
Figure 10B:
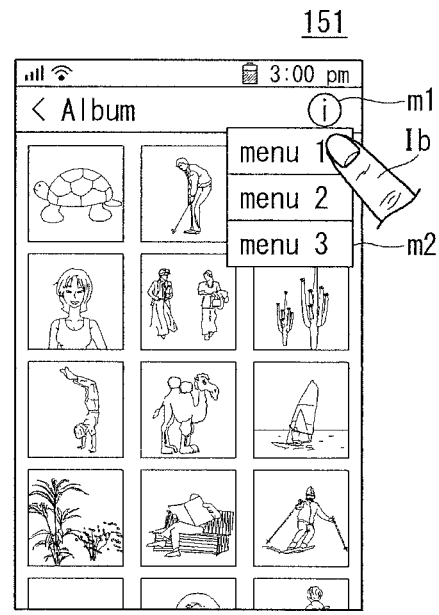
Figure 10C:
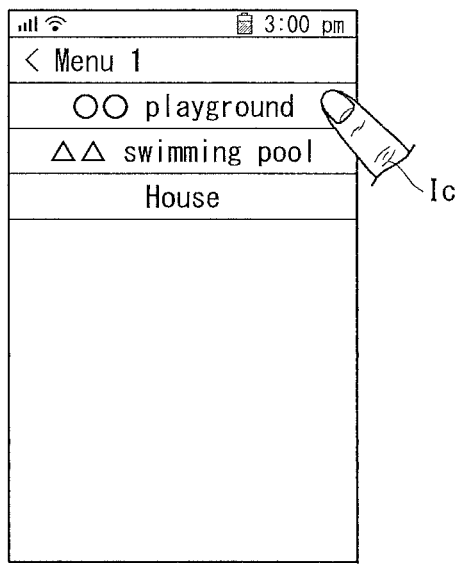
Figure 10D:
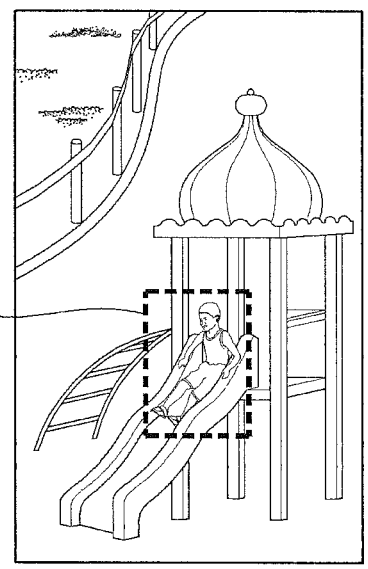
Figure 11A:
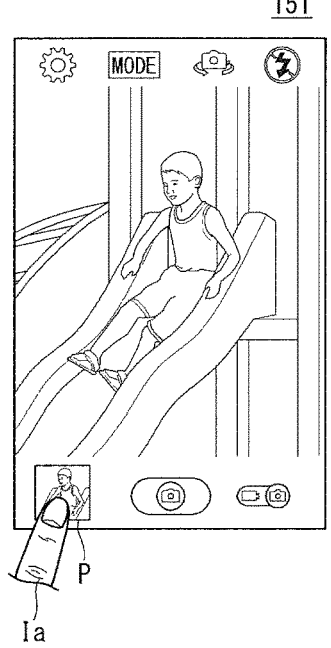
Figure 11B:
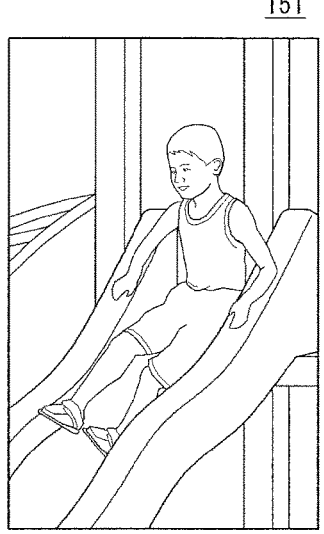
Figure 11C:
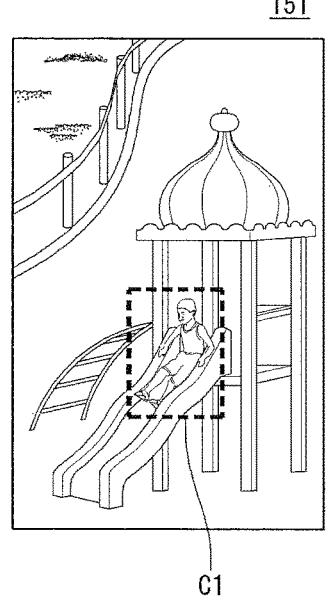
Figure 11D:
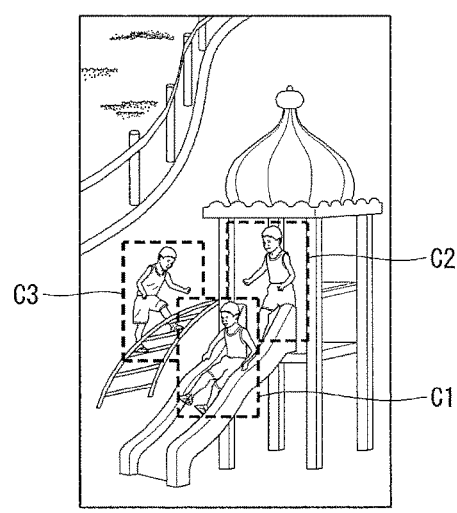
Figure 11E:
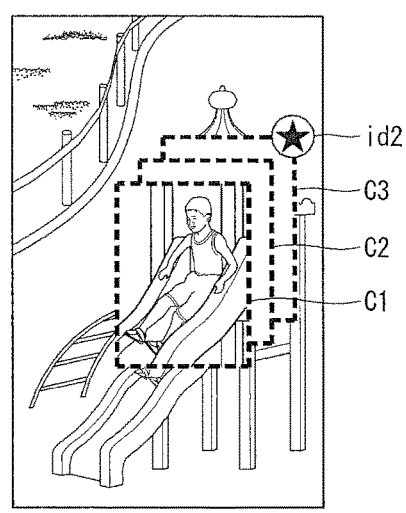
Figure 13A:
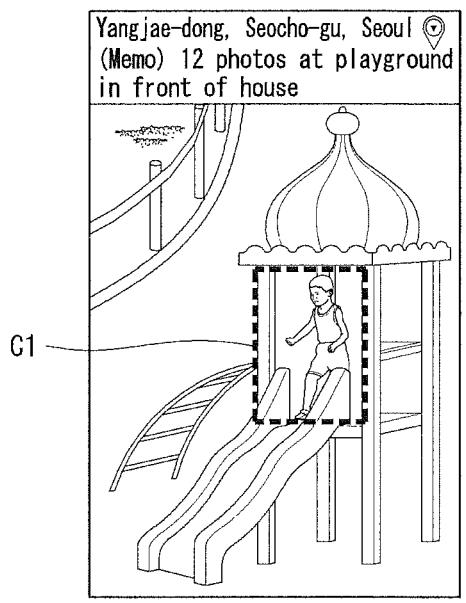
Figure 13B:
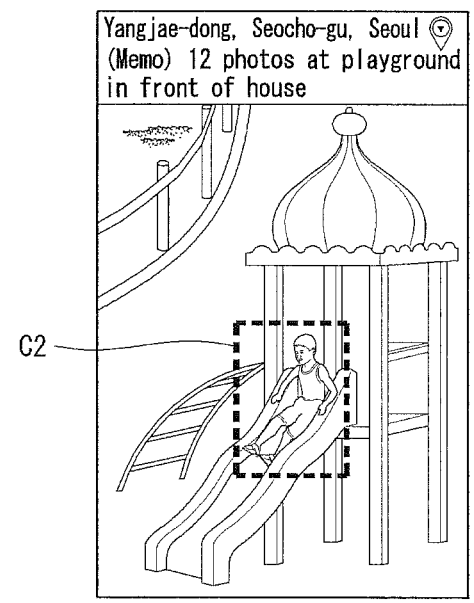
Figure 13C:
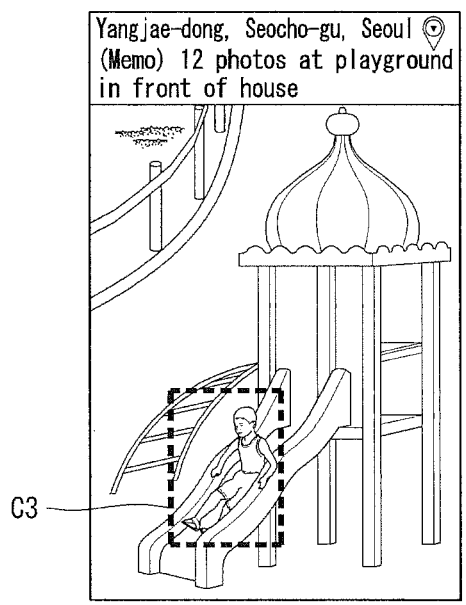
Figure 13D:
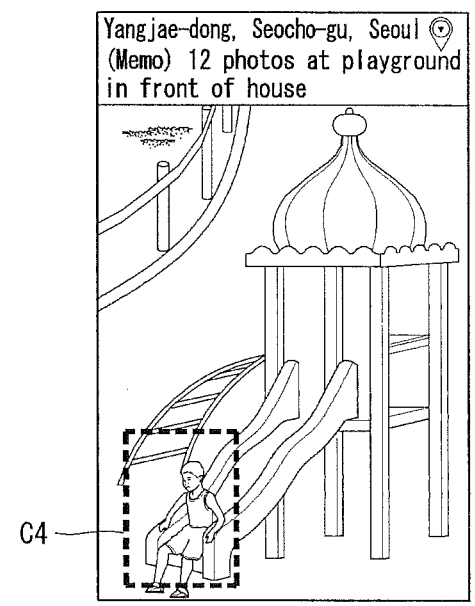

FIGS. 7 to 9 illustrate a method for complementing the background image created by the mobile terminal to complete the background image.

Referring to FIG. 7, when a partial area of the background image is omitted, the controller 180 of the mobile terminal may search whether or not other background image corresponding to the same location information exists in a server, download other background image stored in the server if other background image exists, and supplement the omitted area of the background image.

More specifically, the controller 180 may download a background image of the same location as the omitted area from the server in a state where only a background image of C1 is created and complete the background image as shown in (b) of FIG. 7.

Referring to FIGS. 8 and 9, the controller 180 of the mobile terminal may reflect weather information or time information stored in the mobile terminal on the background image and complete the background image.

More specifically, as shown in FIG. 8, the controller 180 may add a sun image 'a' to the background image using weather information "sunny" and time information "2:21 p.m." stored in the mobile terminal. In addition, the controller 180 may display location information 'b' sensed by the mobile terminal on the background image.

As shown in FIG. 9, the controller 180 may add season information to the created background image and complete the background image by complementing leaves, branch, snow, etc.

FIGS. 10 to 20 illustrate a method for looking at the second image taken with the mobile terminal in the realistic mode. In the embodiment disclosed herein, a method for displaying the image in the realistic mode indicates a method for combinedly displaying the taken second image on the background image.

Referring to FIG. 10, when the controller 180 of the mobile terminal selects a first menu on an execution screen of a gallery application and selects a specific background image (for example, OO playground) (refer to Ia, Ib, and Ic), the controller 180 may display the specific background image on the entire screen of the display unit 151 and combinedly display the taken second image C1 and the background image.

When the controller 180 combinedly displays the taken second image C1 and the background image, the controller 180 may display a boundary line for differentiating the second image C1 from the background image and zoom in or out the second image C1 depending on the size of the background image.

The controller 180 may store information of at least one second image connected to each background image as thumbnail. When the specific background image is selected, the controller 180 may display at least one second image connected to the specific background image on the specific background image.

As shown in (a) of FIG. 11, the controller 180 of the mobile terminal may display the second image C1, which is previously taken, on the display unit 151 through a specific input Ia with respect to a taken image preview icon P displayed on the preview screen. In this instance, a method for displaying the second image may include the general mode for displaying only the second image taken with the mobile terminal on the display unit 151 and the realistic mode for combinedly displaying the taken second image and the background image on the display unit 151.

As shown in (b) of FIG. 11, when the controller 180 receives a first input with respect to the taken image preview icon P, the controller 180 may display the second image C1, which is previously taken, on the entire area of the display unit 151.

As shown in (c) of FIG. 11, when the controller 180 receives a second input with respect to the taken image preview icon P, the controller 180 may combinedly display the second image C1, which is previously taken, and the created background image on the display unit 151.

As shown in (d) and (e) of FIG. 11, when the controller 180 receives a third input with respect to the taken image preview icon P, the controller 180 may combinedly display a plurality of second images C1 to C3, which are previously taken, and the created background image on the display unit 151. In this instance, when the two or more second images C1 to C3 are displayed in a specific area of the background image, the controller 180 may display a second indicator id2 in the specific area.

Referring to FIG. 12, when the controller 180 of the mobile terminal receives a first input Ia with respect to a specific second image C2 in a state where the specific second image C2 is displayed on the display unit 151, the controller 180 may zoom out the specific second image C2 and display the specific second image C2 along with other second images C1 and C3, which are taken before or after taking the specific second image C2, on the display unit 151 as shown in (b) of FIG. 12.

As shown in (c) of FIG. 12, when the controller 180 of the mobile terminal receives a second input Ib with respect to the zoom-out specific second image C2, the controller 180 may combinedly display the specific second image C2 and the background image on the display unit 151. In this instance, when the controller 180 displays the specific second image C2 in the realistic mode, the controller 180 may display a boundary line (indicated by the dotted line) for differentiating the specific second image C2 from the background image and also display the location information 'b' on the display unit 151.

Referring to FIG. 13, when the controller 180 of the mobile terminal displays the second image in the realistic mode, the controller 180 may control the display unit 151 so that the second image is automatically reproduced on the background image depending on shooting time of the second image.

More specifically, when there are four second images C1 to C4 (connected to the same background image) taken with the mobile terminal, the controller 180 may sequentially display the taken second images C1 to C4 on the background image in chronological order based on when they were taken. In this instance, a reproduction time of the taken second images C1 to C4 may be set based on shooting time or may be set so that the taken second images C1 to C4 are reproduced at regular time intervals. Namely, the controller 180 may display the second image C1 obtained by taking an object standing on a slide on the background image of the OO playground. After N seconds passed, the controller 180 may change the second image C1 to the second image C2 obtained by taking the object sitting on the slide and display the second image C2 on the background image of the OO playground. In the same manner, after N seconds again passed, the controller 180 may change the second image C2 to the second image C3 obtained by taking the object sitting in the middle of the slide and display the second image C3 on the background image of the OO playground. After N seconds again passed, the controller 180 may change the second image C3 to the second image C4 obtained by taking the object sitting in a lower portion of the slide and display the second image C4 on the background image of the OO playground.

Figure 14:
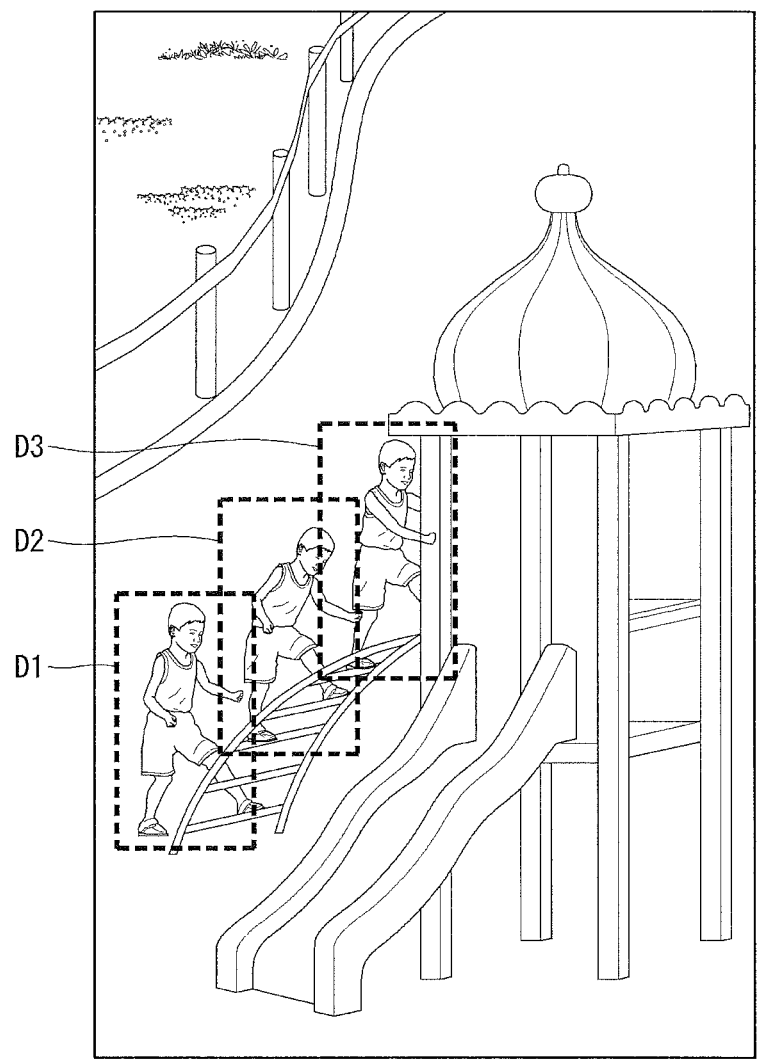

Referring to FIG. 14, when a moving object is included in the first image in the realistic mode, the controller 180 of the mobile terminal may control the display unit 151 so that an image of the moving objet is automatically reproduced on the background image depending on an obtainment time of the first image.

More specifically, the controller 180 may reproduce images D1 to D3 of the moving objet included in the first image obtained while displaying the preview screen on the display unit 151, on the background image as in the taken second image. In the embodiment disclosed herein, when the images D1 to D3 of the moving objet are automatically reproduced, the controller 180 may set a reproduction cycle of the moving objet to be relatively shorter than a reproduction cycle of the second image.

When the controller 180 obtains the images D1 to D3 of the moving objet included in the first image between the plurality of second images, reproduction order of the images may be determined depending on shooting time and obtainment order of the images. For example, after the second images C1 and C2 are displayed on the background image, the images D1 to D3 of the moving objet may be displayed, and then the second images C3 and C4 may be again displayed.

In some implementations, when the controller creates the background image while taking images and stores the created background image and the taken images, the controller may combine and automatically reproduce the taken images on the background image. Hence, the controller may display the images obtained by taking a movement of the object like a video and confirm the movement of the object the user does not directly take.

Referring to FIG. 15, when the controller 180 of the mobile terminal receives a specific input Ia while displaying the second image C2 combined with the background image in the realistic mode, the controller 180 may change the realistic mode to the general mode.

More specifically, when the controller 180 receives the input Ia dragging the second image C2 in a specific direction in the realistic mode, in which the second image C2 is displayed on the background image, the controller 180 may change the realistic mode to the general mode and display the second image C2 on the entire area of the display unit 151. In this instance, when the realistic mode is changed to the general mode, the controller 180 may continuously display the location information on the display unit 151.

When the controller 180 receives a left or right drag input Ib in a state where the second image C2 is displayed in the general mode, the controller 180 may display the second images C1 and C3, which are taken before or after taking the second image C2, on the entire area of the display unit 151. Namely, the controller 180 may perform a change to the images, which are previously or subsequently taken, along a drag direction in the general mode.

Referring to FIGS. 16 and 17, when the controller 180 of the mobile terminal reproduces the second image taken in the realistic mode or the general mode, the controller 180 may display a location of the second image among the entire background image as a mini map in a first area M of the display unit 151. In the embodiment disclosed herein, the first area M indicates a left or right lower area of the display unit 151.

More specifically, when the controller 180 combinedly displays the second images C1 to C3 among the background image in the realistic mode, the controller 180 may display relative locations L1 to L3 of the second image with respect to the background image in the first area M.

Further, when the controller 180 displays the second images C1 to C3 on the entire area of the display unit 151 in the general mode, the controller 180 may display relative locations L1 to L3 of the second image with respect to the background image in the first area M.

Figure 18A:
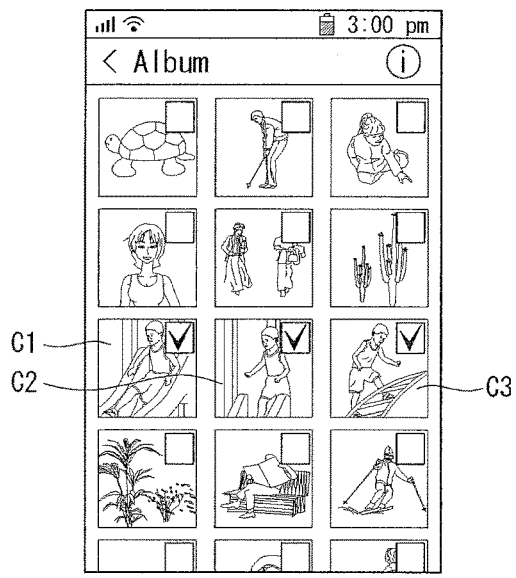
Figure 18B:
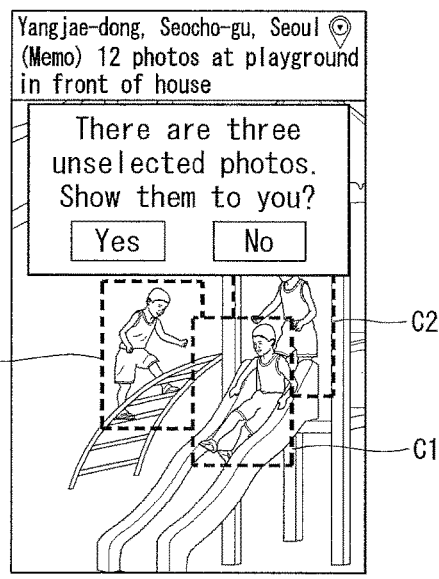
Figure 18C:
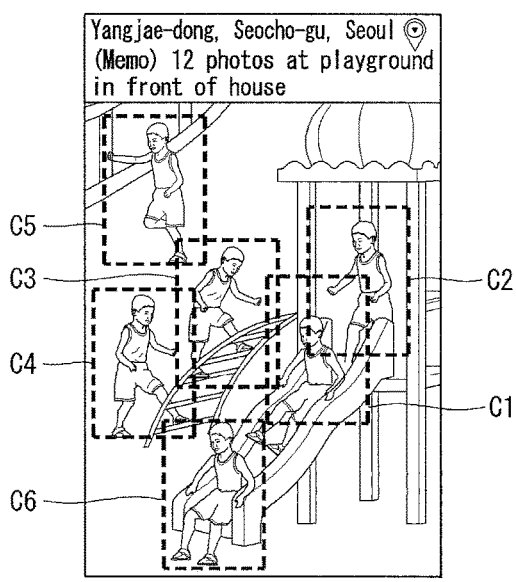

Referring to FIG. 18, when the controller 180 of the mobile terminal selects a specific second image among the plurality of second images displayed on the execution screen of the gallery application, the controller 180 may search a specific background image connected to the specific second image and combinedly display the specific background image and the specific second image on the display unit 151.

Further, the controller 180 may display a popup window, asking whether or not the number of other second images connected to the specific background image and the other second images are displayed, on the display unit 151.

When the user selects "Yes", the controller 180 may search the other second images and display the other second images on one background image.

More specifically, when the user requests the controller 180 to select the second images C1, C2, and C3 displayed on the execution screen of the gallery application and to display them in the realistic mode, the controller 180 may display the popup window asking whether or not other three second images C4 to C6, which are connected to the same background image and stored, are displayed along with the selected second images C1 to C3. When the controller 180 receives a selection input indicating "Yes", the controller 180 may display the second images C1 to C6 on the background image together.

Figure 20A:
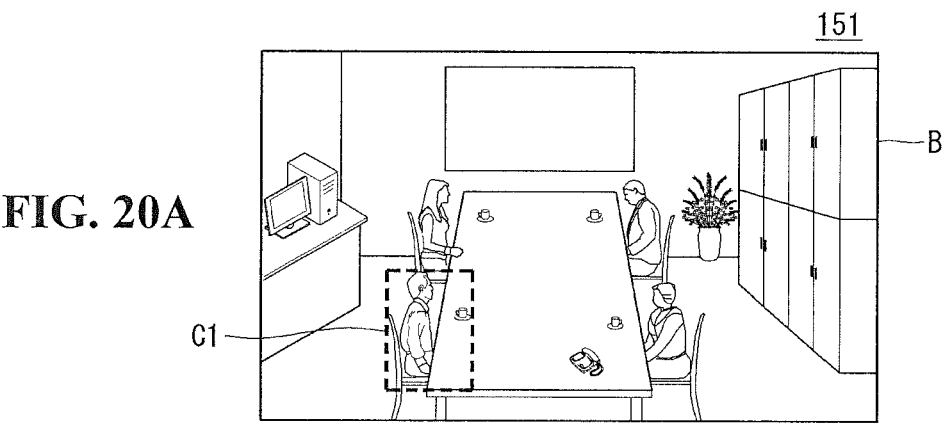
Figure 20B:
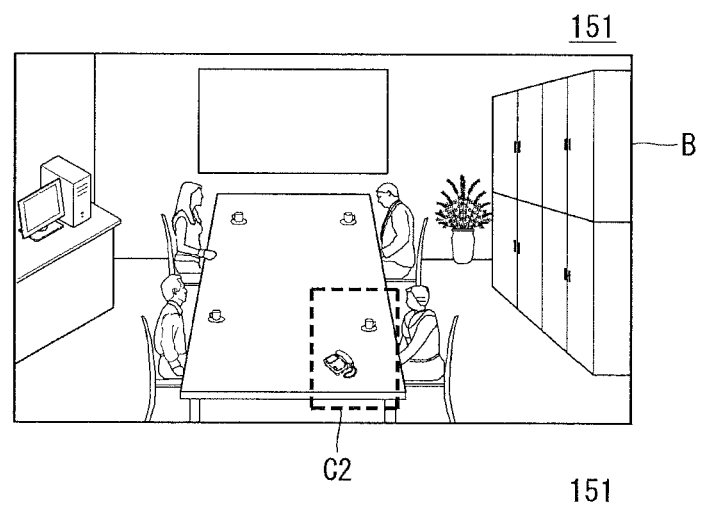
Figure 20C:
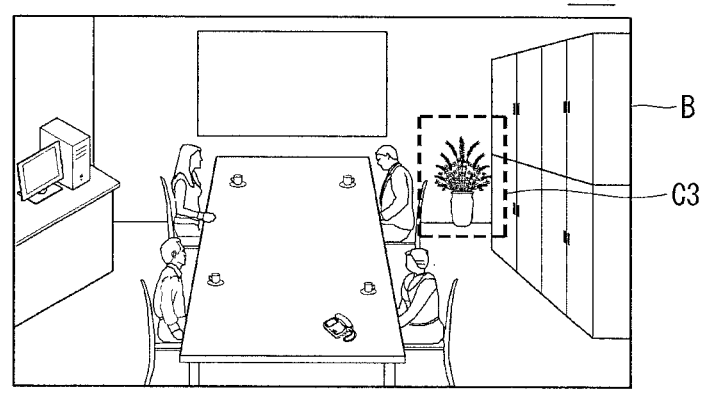

Referring to FIGS. 19 and 20, when the first images are obtained at different locations and different angles, the controller 180 of the mobile terminal may create the background image having a three-dimensional (3D) effect and rotatively display the 3D background image and the taken second image in obtainment order of the first images.

More specifically, the controller 180 may obtain the first image while changing the angle of the camera and create a background image B having the 3D effect. In this instance, as shown in FIG. 19, the controller 180 may divide the background image B having the 3D effect into three parts B1 to B3 in a two-dimensional (2D) structure and sequentially display the second images C1 to C3 respectively combined with the divided background images B1 to B3 on the display unit 151.

As shown in FIG. 20, the controller 180 may display the 3D background image B on the entire area of the display unit 151 and sequentially display the taken second images C1 to C3 on the 3D background image B.

As described above, some implementations may create the 2D or 3D background image, reproduce the taken second image connected to the background image on the entire background image in shooting order, and grasp the entire moving path of the moving object with the user's eye. Hence, the user can view the taken image.

Various embodiments may be implemented using a machine-readable medium having instructions stored thereon for execution by a processor to perform various methods presented herein. Examples of possible machine-readable mediums include HDD(Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
   a camera;
   a display unit; and
   a controller configured to:
   control the camera,
   display a preview screen on the display unit,
   obtain a first image through the camera while displaying the preview screen,
   obtain a second image in response to receiving a first input,
   change the mobile terminal to a mode that is configured to generate a background image based on a number of times of successively obtaining the second image and the second image having location information that is equal to or greater than a predetermined value;
   generate a background image using the first image,
   combine the background image and the second image to generate a combined image,
   store the combined image, and
   display, on the display unit, the combined image, in response to receiving a second input.

2. The mobile terminal of claim 1, wherein the controller is further configured to:
   omit, from the first image, an object that was moving during obtaining of the first image,
   combine a plurality of images, including the first image, based on a similarity between the plurality of images, and
   generate a background image based on the combined plurality of images.

3. The mobile terminal of claim 1, wherein based on a partial area of the background image being omitted, the controller is further configured to:
   request another background image that corresponds to the background image and that is stored on a server, and
   generate the omitted partial area of the background image using the other background image that is stored on the server.

4. The mobile terminal of claim 1, wherein based on a change in an angle of the camera being equal to or greater than a predetermined reference value and based on displaying the preview screen, the controller is configured to generate the background image.

5. The mobile terminal of claim 1, wherein the controller is further configured to display a boundary line that differentiates the second image from the background image.

6. The mobile terminal of claim 1, wherein the controller is further configured to:
   adjust a size of the second image based on a ratio of the second image to the background image, and
   overlap the second image on the background image.

7. The mobile terminal of claim 1, wherein based on the controller displaying the second image on all of the display unit and receiving a third input that is associated with the display unit, the controller is configured to display, on the display unit, the combined image.

8. The mobile terminal of claim 1, wherein based on the controller displaying the combined image, the controller is further configured to automatically reproduce, on the display unit, the second image on the background image based on a shooting time of the second image.

9. The mobile terminal of claim 1, wherein based on an object that is in the first image and that was moving during obtaining of the first image, the controller is further configured to automatically reproduce, on the display unit and on the background image, an image of the object that was moving during obtaining of the first image based on an obtainment time of the first image.

10. The mobile terminal of claim 9, wherein based on the image of the objet that was moving during obtaining of the first image being automatically reproduced, the controller is further configured to set a reproduction cycle of the objet that was moving during obtaining of the first image to be less than a reproduction cycle of the second image.

11. The mobile terminal of claim 1, wherein based on the controller receiving a fourth input associated with the display unit and based on the display unit displaying the combined image, the controller is further configured to display the second image on all of the display unit.

12. The mobile terminal of claim 11, wherein based on the controller displaying the second image on all of the display unit, the controller is further configured to display a zoom-out image that includes the background image and data indicating a location where the mobile terminal obtained the second image in a first area of the display unit.

13. The mobile terminal of claim 1, wherein based on the combined image being in a plurality of second images, the controller is configured to:
   display the plurality of second images combined with and the background image, and
   display a second indicator in a specific area of the background image based on two or more of the plurality of second images being displayed in the specific area of the background image.

14. The mobile terminal of claim 1, wherein the controller is further configured to
   include weather information or time information stored in the mobile terminal in the background image, and
   store a plurality of background images that correspond to a same location depending on the weather information or the time information.

15. A method for controlling a mobile terminal comprising:
   displaying, on a display unit, a preview screen by controlling a camera;
   obtaining a first image through the camera while displaying the preview screen;
   obtaining a second image based on receiving a first input;
   changing to a mode that is configured to generate a background image based on a number of times of successively obtaining the second image and the second image having location information that is equal to or greater than a predetermined value;
   generating a background image using the first image;
   combining the background image and the second image to generate a combined image;
   storing the combined image; and
   displaying the combined image based on receiving a second input.

16. A mobile terminal comprising:
   a camera;
   a display unit; and
   a controller configured to:
      control the camera,
      display a preview screen on the display unit,
      obtain a first image through the camera while displaying the preview screen,
      obtain a second image in response to receiving a first input,
      generate a background image using the first image,
      combine the background image and the second image to generate a combined image,
      store the combined image,
      display, on the display unit, the combined image, in response to receiving a second input,
      automatically reproduce, on the display unit and on the background image, an image of the object that was moving during obtaining of the first image based on an obtainment time of the first image based on an object that is in the first image and that was moving during obtaining of the first image, and
      set a reproduction cycle of the objet that was moving during obtaining of the first image to be less than a reproduction cycle of the second image based on the image of the objet that was moving during obtaining of the first image being automatically reproduced.

* * * * *